July 17, 1951 — F. K. KNOHL — 2,560,961
FASTENER
Filed Nov. 29, 1947
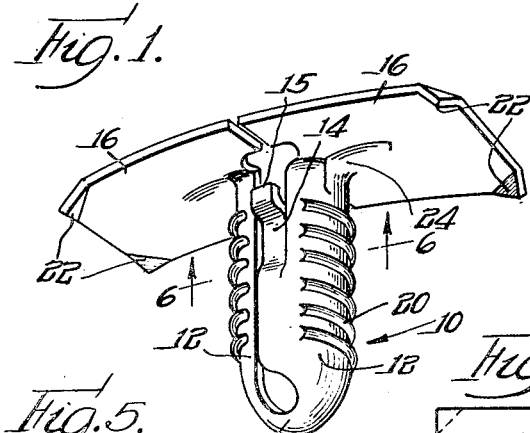
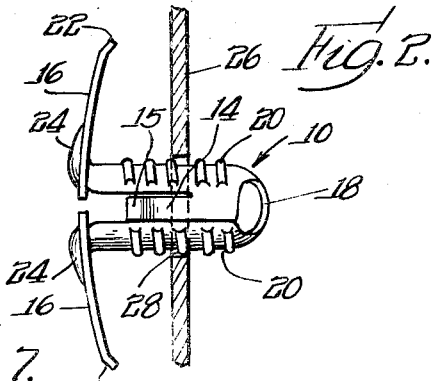
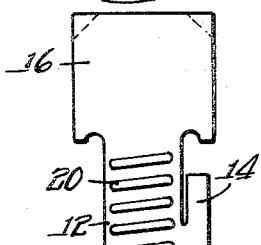
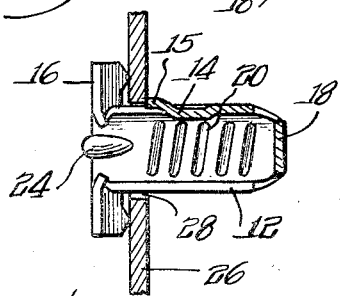
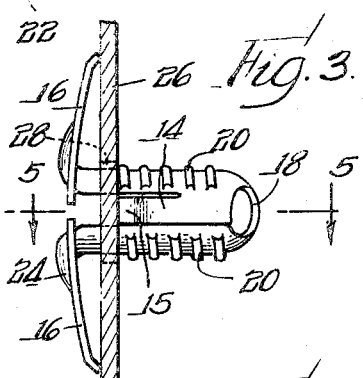
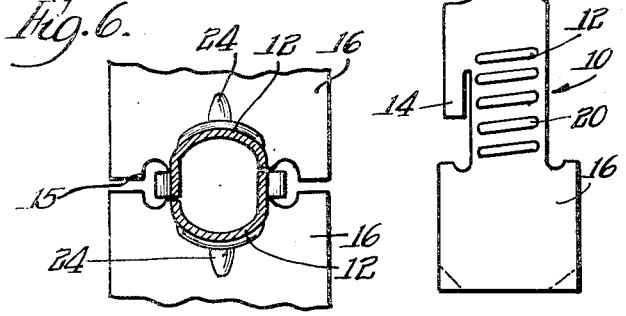
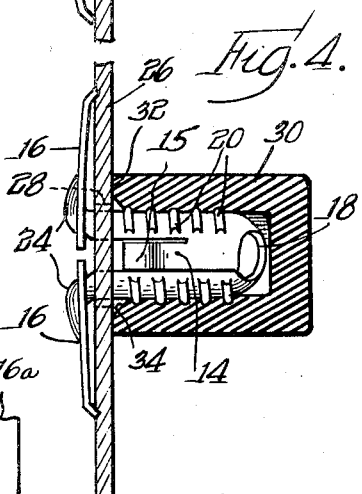
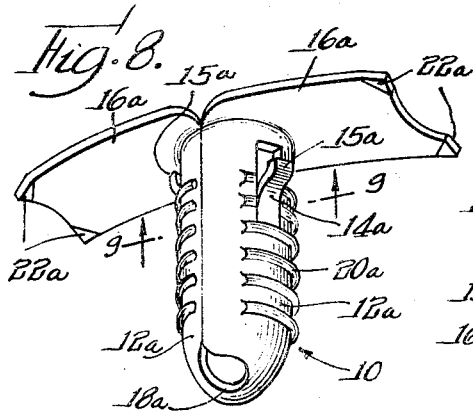
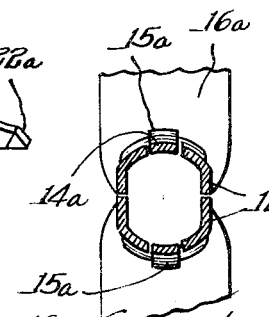
INVENTOR.
Friedrich Karl Knohl
By: Moore, Olson & Trexler
Attys.

Patented July 17, 1951

2,560,961

UNITED STATES PATENT OFFICE 2,560,961

FASTENER

Friedrich Karl Knohl, Chicago, Ill., assignor to Illinois Tool Works, Chicago, Ill., a corporation of Illinois Application November 29, 1947, Serial No. 788,867

5 Claims. (Cl. 151—41.75)

This invention relates generally to fasteners and more particularly to sheet metal fasteners of the type equipped with a threaded shank portion and a resilient head at one end.

Certain fasteners of the type having a threaded shank for accommodating a rotary clamping member such as a nut require retention in an apertured work part against axial and rotary movement to enable subsequent application of the rotary clamping member on the threaded shank. It is the usual practice during the application of the complementary nut member on the threaded shank to hold the fastener against axial and rotary movement with the hand or by use of a tool such as a screw driver. Such procedure is time consuming and makes the installation difficult to accomplish. In blind installations, where one side of a panel or work sheet is inaccessible, the application of such a fastener unit may even be impossible unless two operators are available or means is provided to retain one of the relatively rotatable fastener parts in fixed position with respect to the work part. Therefore, it is a primary object of the present invention to provide a one-piece sheet metal fastener of simple yet practical construction which may be preassembled to a work part prior to the association therewith of a complementary rotary clamping member for securing the fastener to the work piece.

It is still another important object of the invention to provide a fastener as set forth above having novel means for retaining the fastener in fixed position upon an apertured work part.

It is still another object of the present invention to provide a sheet metal fastener of the type referred to having a resilient head which will make it possible for one fastener to be preassembled on panels or work sheets of various thicknesses.

It is still a further object of the present invention to provide a fastener which may be produced from a sheet metal elongated blank in which the grain of the metal extends longitudinally of the blank, thereby decreasing the possibility of failure of the resilient portions of the completed fastener after successive applications of the fastener to a work part.

It is still a further object of the present invention to provide a fastener of the type hereinbefore mentioned which, although made of sheet material, is designed to afford great strength and which may be economically produced by the use of well-known methods of manufacture.

These and other objects of the present invention will be more fully understood after reading the following description with reference to the accompanying drawings wherein:

Figure 1 is a perspective view of one form of the fastener embodying the present invention;

Figure 2 is a side view of the fastener shown in Figure 1 during initial application thereof to an aperture of a work part or panel;

Figure 3 is a side view of the fastener shown after complete insertion thereof within the aperture of the work part, in readiness to receive a rotary clamping member;

Figure 4 is a view similar to Figure 3 showing the fastener secured in final position by an internally threaded nut member;

Fig. 5 is a longitudinal sectional view of the fastener taken along the line 5—5 in Figure 3;

Figure 6 is a cross sectional view of the fastener shank taken along the line 6—6 in Figure 1;

Figure 7 is a plan view of the blank from which the fastener shown in Figures 1 to 6 may be formed;

Figure 8 is a perspective view of a modified form of the fastener; and

Figure 9 is a cross sectional view of the fastener stud taken along the line 9—9 of Figure 8.

Referring now to the drawing more in detail wherein like numerals have been employed to designate similar parts throughout the various views, it will be seen that a preferred form of the fastener embodying the instant invention is shown in Figures 1 to 7, inclusive, and designated generally by the numeral 10. The fastener 10 is comprised of two oppositely concaved stud or shank portions 12 joined at one end by a connecting portion 18, the shank portions 12 having their longitudinal edges lying in abutting relation to provide a tubular shank. Sheared from opposed longitudinal margins of the shank portions 12 are resilient latching means or arms 14, the free ends 15 of the latching arms 14 being spaced laterally from the plane of the fixed ends of the shank portions 12. Thus, the free ends 15 of the latching arms 14 are formed to extend outwardly beyond the periphery of the shank body while the remaining portions of each arm lie within the peripheral boundaries of the shank body. The shank portions 12 are provided with peripheral extrusions or partial thread convolutions 20 for accommodating a complementary threaded member or nut.

The shank or stud portions 12 are provided at one of their ends with head portions or wings 16. These head portions 16 extend laterally outwardly from the stud portions 12 and are preferably bowed toward the entering end of the shank. A plurality of work gripping teeth or tabs 22 on the head portions 16 extend toward the entering end of the fastener stud. It should be noted at this point that in some installations the addition of ribs at the junction of shank portions 12 and the head portions or wings 16 may be necessary sufficiently to strengthen the head portions 16. By providing these strengthening ribs 24, not only are the head portions strengthened but bending occurring in this area will be restricted to that portion of the stock located on each side of the strengthening ribs. Continued reuse of a fastener member necessitates strengthening ribs to prevent fracture in the vicinity of the adjacent bending area.

Figures 2, 3 and 4 show fastener 10 in the various stages of insertion within an apertured work piece 26. Figure 2 shows the initial partial insertion of a fastener into the work aperture 28, the latching means 14 of the fastener not yet having been forced through the work aperture. Continued insertion of the fastener causes the resilient latching means or arms to flex or collapse within the shank body until it reaches the position shown in Figure 3. In this position arms 14 have returned to their normal latching position and the free ends 15 coact with the head portions 16 to hold the fastener in a fixed position within the aperture 28 of a work piece 26. As indicated in Figure 3 resilient head portions 16 remain arched and yieldably urge the fingers or arms 14 into latching engagement with the work piece 26. It should be noted that the work gripping tabs or teeth 22 through the agency of the resilient head positively engage and bite into the work piece 26 to resist rotation of the fastener. In Figure 4 a rotary clamping member or nut 30 has been applied to the shank of the fastener 10 and tightened against one surface of the work piece 26 so as to draw the head portions 16 toward the adjacent surface of the work piece. In this position the clamping end or surface 32 of the nut 30 on one side of the work sheet or panel 26 and the head portion 16 on the opposite side coact to clampingly and firmly hold the fastener in position. The clamping end 32 of the member 30 is chamfered to provide clearance for the finger ends 15.

Figure 7 shows the elongated blank from which the fastener 10 in Figures 1 to 6, inclusive, is formed. Where the fastener is made from sheet metal or like material the blank is preferably stamped from the material so that the longitudinal axis of the blank coincides with the grain of the sheet material. By stamping the blank in this manner the grain of the material passes across the areas of bending associated with the resilient latching means 14 and the head sections 16 to greatly reduce the possibility of fracture in these areas from repeated flexing of these elements.

Figures 8 and 9 show another form of the fastener embodying the present invention. The same numerals are used to identify like parts with the addition of the suffix "a." In this embodiment of the invention the latching means or arms 14a of the fastener 10a are spaced from the margins of the shank portions 12a. Positioning of these latching means 14a within the margins of the shank portions 12a permits the entire length of the longitudinal margins of the shank portions 12a to lie in abutting relation, thereby providing increased strength to the shank of the fastener 10a. In other respects the fastener 10a is similar to the fastener 10 heretofore described.

From the foregoing it will be apparent that the present invention contemplates a sheet metal fastener of sturdy construction, latching elements 14 and 14a and resilient head portions 16 and 16a providing effective means for automatically preassembling the fastener with the work piece or panel. Furthermore, the arched head enables a single fastener to be used with equal facility to accommodate work pieces of varying thicknesses. The provision of peripheral protuberances or thread convolutions on the shank of the fastener in addition to serving as means for accommodating a rotary member or nut, strengthens the concaved shank portions to assure a fastener stud of great strength.

While two preferred embodiments of the fastener have been shown and described for purposes of disclosing the invention, the invention is not to be limited to these forms but rather is intended to include such changes and modifications as fall within the spirit and scope of the appended claims.

The invention is hereby claimed as follows:

1. The combination comprising an apertured work piece, a one piece sheet metal fastener, and a nut member, said fastener including two oppositely concaved shank portions connected at one end, the longitudinal edges of said shank portions lying in abutting relation to provide a tubular shank, laterally extending resilient head portions formed on said shank portions at the ends thereof opposite the connected ends, yieldable latching fingers integral with said shank and having the free extremities normally extending radially outwardly from the shank periphery to present work engaging shoulders facing the head portions, the ends of said head portions being disposed toward said latching fingers, said latching fingers and said resilient head portions being disposed to effect automatic gripping of the work piece therebetween as an incident to telescopic association of the tubular shank and the apertured work piece, thread convolutions on said shank portions, means formed on said fastener for grippingly engaging the work piece to prevent rotation of the fastener with respect to the work piece during mounting of the nut member thereon, said nut member having a recess formed therein, the sides defining said recess having means formed thereon to receive and cooperate with the thread convolutions on said shank portions, the end of said nut member adjacent the work piece serving to seal the aperture in said work piece when the nut member is threaded on the shank portions of the fastener.

2. A one-piece sheet metal fastener for use with an apertured work piece including a head structure and a shank comprising two oppositely concaved shank sections connected at their entering extremities, at least a portion of the longitudinal margins of said shank sections adapted to lie in abutting relation to provide a tubular shank, laterally extending and axially resilient head portions at the free extremities of the shank sections to form said head structure, yieldable latching fingers integral with said shank and having the free extremities normally extending radially outwardly from the shank periphery to present work engaging shoulders facing the head structure, the outer peripheral opposed margins of said head structure being deflected axially toward the entering extremities of said shank sections and cooperatively disposed with respect to the shoulders of said latching fingers for yieldably clamping a work piece between the head structure and said shoulders as an incident to telescopic association of the shank with an apertured work piece, helically disposed thread forming extrusions on said shank sections between the entering extremities thereof and said latching fingers for cooperation with a nut member, and means on said head structure in the vicinity of the outer margins thereof for lockingly impinging a complementary work surface to counteract tendency for the inserted fastener to rotate relative to the work surface when a nut is rotatably applied to the fastener shank.

3. A sheet metal fastener as claimed in claim 2, wherein intermediate portions of the latching fingers lie within the periphery of the shank.

4. A sheet metal fastener as claimed in claim 2, wherein the latching fingers are formed along the longitudinal edges of the shank sections.

5. A sheet metal fastener as claimed in claim 2, wherein the latching fingers are formed from within the longitudinal margins of the shank sections.

FRIEDRICH KARL KNOHL.

REFERENCES CITED

The following references are of record in the file of this patent:

UNITED STATES PATENTS

| Number | Name | Date |
|---|---|---|
| 1,315,998 | Southgate | Sept. 16, 1919 |
| 1,560,296 | Mahaffey | Nov. 3, 1925 |
| 1,833,554 | Baynes | Nov. 24, 1931 |
| 1,919,940 | Hall | July 25, 1933 |
| 1,970,335 | Place | Aug. 14, 1934 |
| 2,069,849 | Rich | Feb. 9, 1937 |
| 2,226,491 | Gustafson | Dec. 24, 1940 |
| 2,244,975 | Tinnerman | June 10, 1941 |
| 2,319,058 | Hansman | May 11, 1943 |
| 2,408,340 | Poupitch | Sept. 24, 1946 |